Oct. 28, 1952     F. A. BEYER ET AL     2,615,587
CONVEYER SYSTEM FOR VEHICLES
Filed June 24, 1949     3 Sheets—Sheet 1
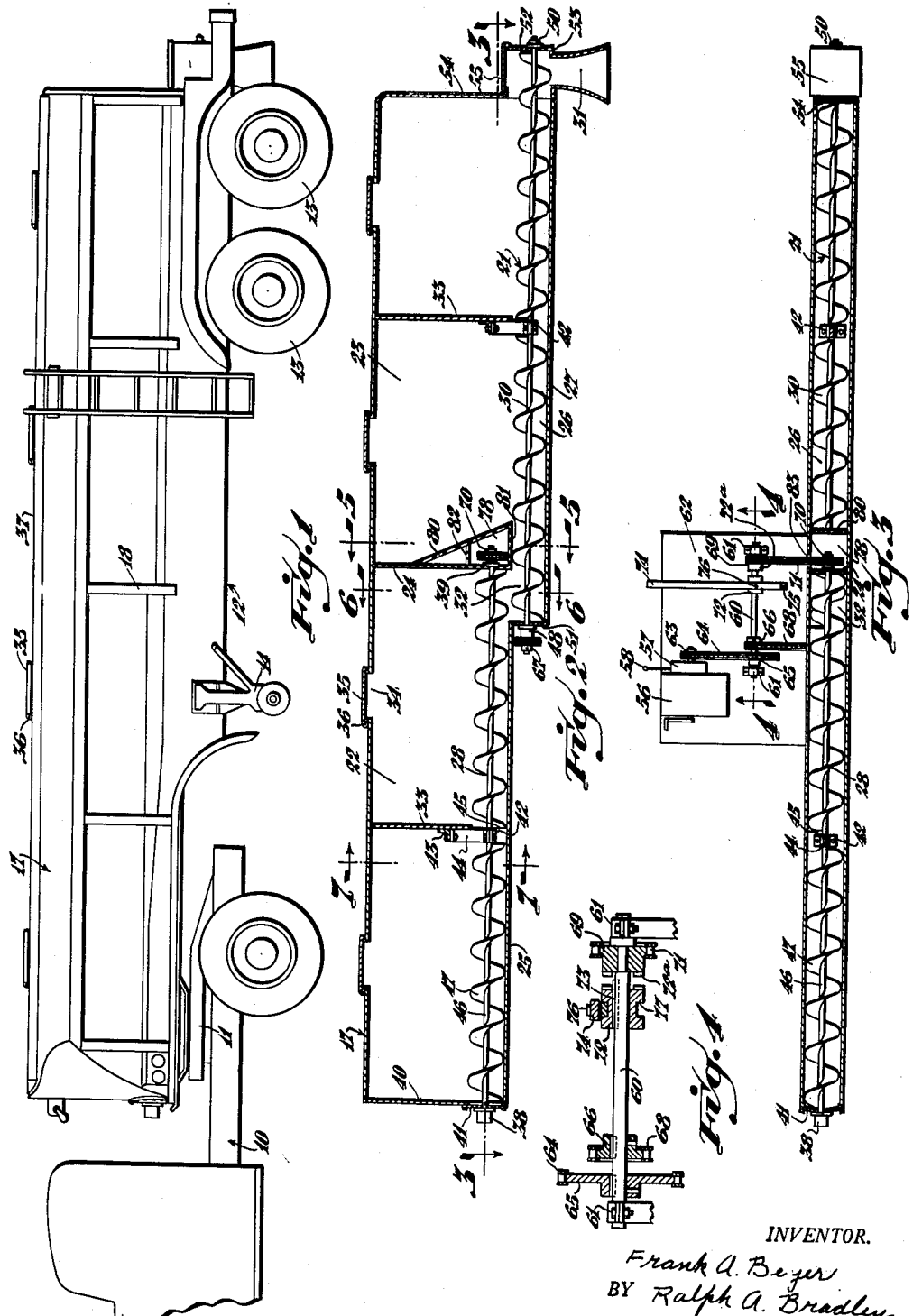
INVENTOR.
Frank A. Beyer
BY Ralph A. Bradley
Wood, Arey, Herron & Evans
ATTORNEYS.

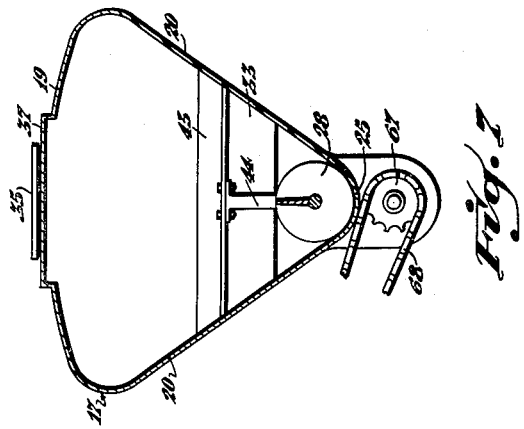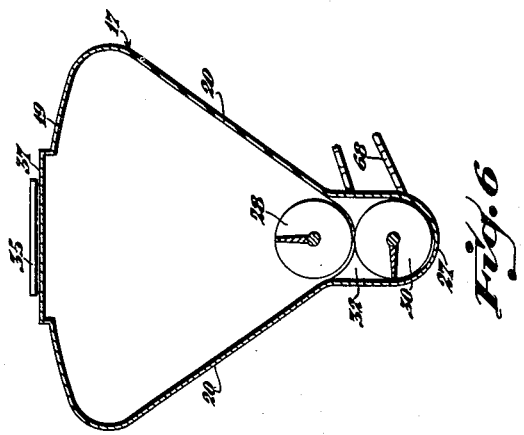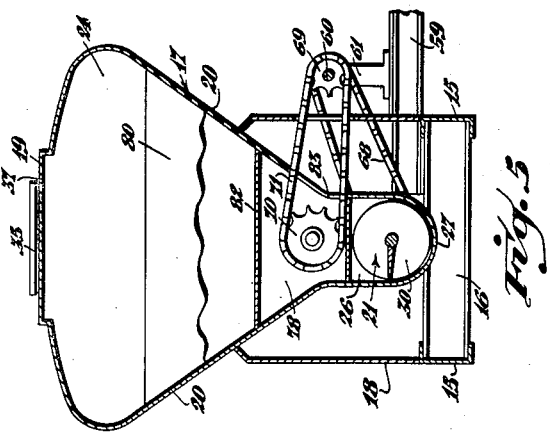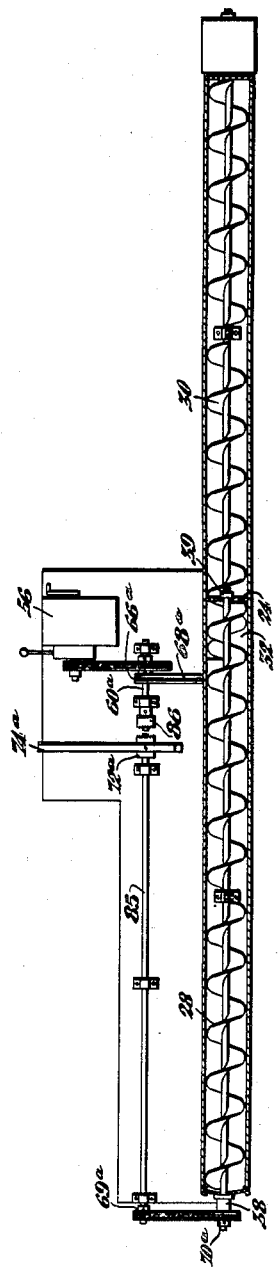

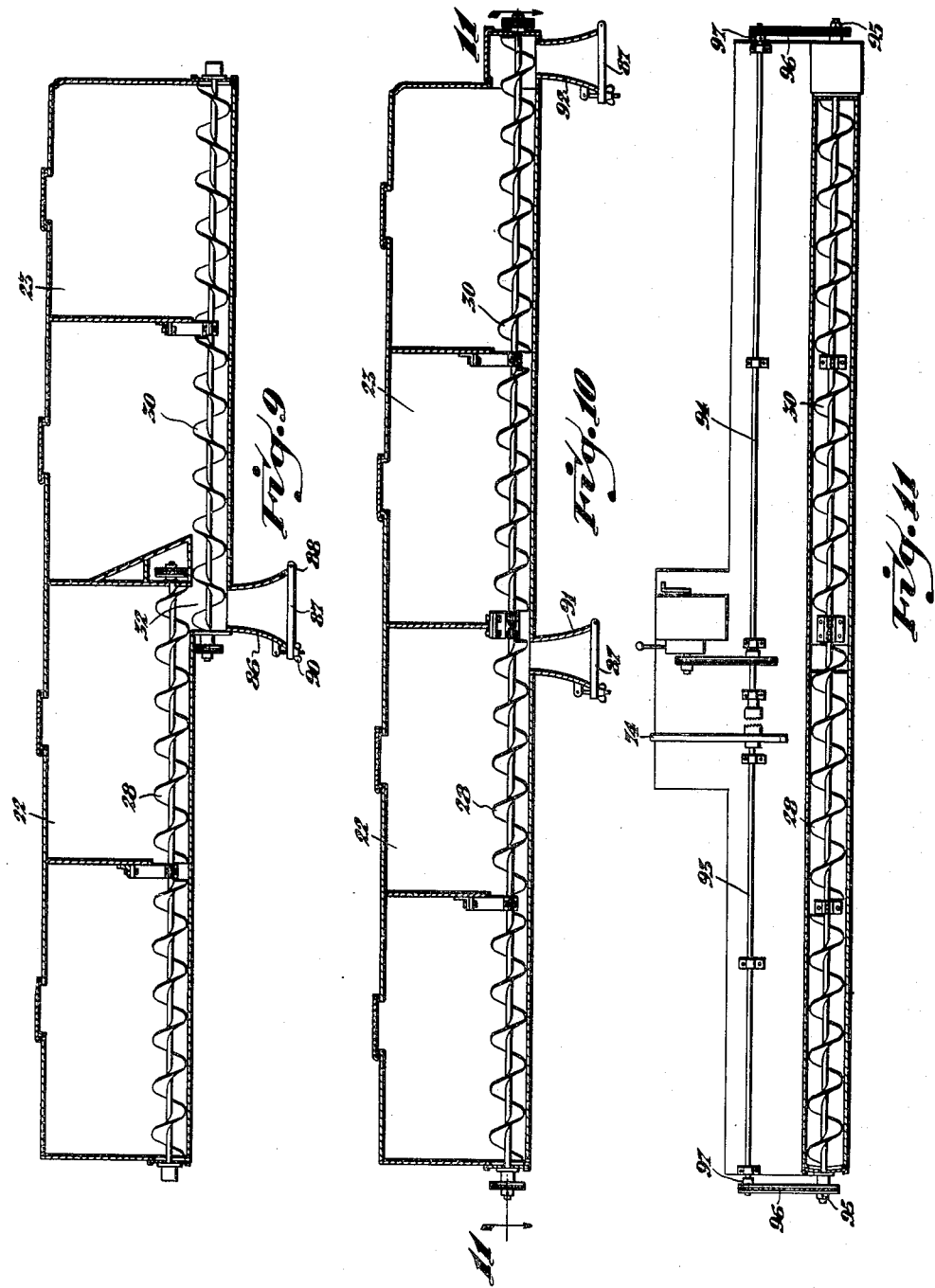

Patented Oct. 28, 1952

2,615,587

UNITED STATES PATENT OFFICE 2,615,587

CONVEYER SYSTEM FOR VEHICLES

Frank A. Beyer and Ralph A. Bradley, Springfield, Mo., assignors, by mesne assignments, to Trailmobile Inc., a corporation of Delaware Application June 24, 1949, Serial No. 101,182

6 Claims. (Cl. 214—83.16)

This invention relates generally to vehicles and particularly to a road vehicle for hauling bulk loads of Portland cement and similar pulverized or granulated materials which should be protected from contamination by moisture and dirt while in transit. The vehicle is equipped with an elongated tank or container for the material, there being installed lengthwise within the tank a conveyor system for feeding the material by power from the tank. The invention resides particularly in an improved screw conveyor which is divided into selectively driven sections, combined with improvements in the tank structure to render more efficient the operation of the conveyor and to provide more uniform distribution of the load.

The improved arrangement was designed primarily for semi-trailers in which the forward weight load is supported by a tractor with the rearward load sustained by one or more sets of road wheels, although it is contemplated also to apply the same conveyor system to tank trucks and other vehicles as well as to stationary tanks or hoppers. As applied to a trailer, it is desirable to keep trailer weight at a minimum in order to carry the greatest pay load, consequently it is important to provide for the screw conveyor a power plant of the least possible weight and bulk consistent with efficient performance. Also, since trailers and trucks which operate over public roads are subject to regulations limiting the weight load upon the wheels, it is essential to distribute and maintain the load uniformly in the tank.

In general, the trailer constitutes a chassis upon which is mounted a full length tank generally V-shaped in cross section, having a series of openings for loading, and having a power driven screw or spiral vane conveyor system located in the tank bottom, arranged to discharge the material from an end of the tank. Resistance of the conveyor screw against rotation increases in proportion to the length of the tank; in other words, rotation of the screw is resisted for the entire length of the tank if a one-piece screw is used. However, this is unnecessary since the unloading operation can be performed just as efficiently if the material is engaged by the screw near the discharge end only, in which case the power required to drive the screw is decreased proportionately.

The primary objects of the invention have been to reduce the power requirements by splitting the conveyor screw into individually driven sections and to provide in conjunction with the conveyor, a tank which is divided into compartments to prevent shifting of the load, the compartments being co-extensive with the respective screw sections to permit selective unloading of the compartments.

Further objects have been to provide a sectional screw conveyor system having screw sections disposed one above another with the adjoining ends of the sections overlapped and connected by a passageway so that the material is discharged by positive displacement from the end of one screw section to the beginning of the next section and to provide improvements in the tank structure and arrangement of the power unit whereby direct, close coupled driving connections for the screw sections are established, with the power unit, transmission system and screw bearings placed to the exterior of the tank for convenient inspection and service.

In the preferred structure, power for rotating the screw is reduced to a minimum by splitting the screw into two overlapping sections, which are selectively driven, one in advance of another to unload the tank in successive sections. After one compartment of the tank is unloaded, the next screw section is coupled for unitary rotation with the first section to unload the next compartment by combined operation of both screw sections. This arrangement results in a substantial reduction in power requirements with the result that a smaller power plant may be utilized, and if desired, permits the compartments to be unloaded separately.

Because of the character of the material, it tends to shift while the vehicle is in transit with the result that the original weight distribution is disturbed. By providing compartments in the tank, the original weight distribution is preserved in spite of rapid acceleration, quick stops and traveling over hilly country. To facilitate loading, each compartment is served by an individual loading hatch which includes a cover or trap door to seal off the compartment after loading.

In the preferred disclosure, the tank is divided into a forward and rearward compartment by a central partition, the material being discharged from a chute at the rearward end of the tank. The bottom of the forward compartment is higher than that of the rearward compartment so that the respective screw sections lie in parallel planes, one directly above the other, with their adjoining ends overlapped at the juncture of the two compartments and with several turns of each screw effective to feed positively the material from the upper screw section to the lower. Since the bottom of the two tank compartments lies at different levels, there is provided an offset enclosing the overlapping screw sections and forming a vertical passageway for conducting the material from the first to the second screw section. The end of one screw section extends outwardly of the tank through a bearing mounted on the end wall of the offset and the end of the other section extends through a bearing mounted on the central partition, passing into a tunnel extending crosswise of the shell. The overlapping ends of the screws are connected to the driving apparatus by respective sprocket and chain drives placed side by side, providing a direct, close coupled connection to the driving apparatus.

The driving mechanism includes a clutch and motor, the motor being permanently in driving connection with the rearward screw section and being selectively coupled to the forward screw section by the clutch. In unloading a full tank, the clutch is uncoupled from the forward screw section so that only the rearward screw section is driven to unload the rearward compartment, the forward screw section remaining stationary. After the rearward compartment is emptied, the clutch is shifted to couple the forward screw section, whereupon both sections rotate in unison, the material being conveyed from the forward compartment, fed to and conveyed by the rear screw section through the now empty rear compartment to the discharge chute. Due to the selective driving of the screw sections, the power requirements are materially decreased while at the same time, by reason of the overlapping screw sections and tank structure, the operation is positive and efficient.

The screw arrangement is of particular advantage as applied to a semi-trailer since the forward end of the trailer necessarily is higher than the rearward and to accommodate the fifth wheel. The two level screw system complements this design by permitting the bottom of the forward compartment to be made higher than the rearward one.

Further details and advantages will be apparent from the following description in conjunction with the accompanying drawings so that those skilled in the art will comprehend fully the various modifications of which the invention is capable.

In the drawings:

Figure 1 is a general side elevation of a trailer having a tank body provided with the improved sectional screw conveyor system.

Figure 2 is a longitudinal section taken through the tank, illustrating the general arrangement of the conveyor system.

Figure 3 is a longitudinal sectional view taken on line 3—3, Figure 2, illustrating the conveyor screws and driving apparatus for selectively driving one or both screws.

Figure 4 is an enlarged sectional view taken on line 4—4, Figure 3, further detailing the selective driving apparatus.

Figure 5 is a cross sectional view taken on line 5—5, Figure 2, illustrating the tank structure, the disposition of the conveyor screws relative to the tank bottom and the driving connections between the screws and drive shaft.

Figure 6 is a sectional view taken on line 6—6, Figure 2, further illustrating the tank, particularly the overlapping relationship of the screws at the center whereby the material is fed from the upper to the lower screw section.

Figure 7 is a sectional view taken on line 7—7, Figure 2, illustrating one of the intermediate partitions of the tank together with the structure for supporting an intermediate bearing for the conveyor screw.

Figure 8 is a longitudinal sectional view similar to Figure 3, illustrating a modified arrangement by which the forward screw is driven at its forward end, as distinguished from the arrangement shown in Figure 3.

Figure 9 is a longitudinal section similar to Figure 2, illustrating a modified arrangement, one of the screw sections having a reversed pitch, and both sections being connected to a discharge chute for direct discharge into the chute by either section.

Figure 10 illustrates a further modification in which the screw sections are placed end to end in axial alignment, there being provided a separate discharge chute for each screw section.

Figure 11 is a longitudinal sectional view taken on line 11—11, Figure 10, illustrating the driving apparatus for selectively driving the screw sections of Figure 10.

In the drawings, the conveyor structure is disclosed as part of a semi-trailer designed especially for hauling bulk loads of Portland cement and similar pulverized, granulated or crushed materials which can be handled by screw conveyors. However, it will be evident that the improved system is not restricted to vehicles but can be utilized for any other service which involves the conveying of materials by spiral vanes or screws, particularly those installations which, by reason of length, can be made more efficient by breaking the screw into independently driven sections.

Referring to Figure 1, which discloses a preferred form of the invention, the tractor is indicated generally at 10, having a fifth wheel 11 for supporting the forward end of the semi-trailer 12, the rearward end of the trailer being supported by sets of wheels 13—13. A landing gear or prop 14 is mounted toward the forward end of the trailer to support it when it is uncoupled from the tractor. The structural details of the semi-trailer are well known in the art and are not relevant to the present disclosure and for this reason are not disclosed in greater detail. It is to be noted however that the two level conveyor and tank is particularly adapted to semi-trailers since the bottom of the tank is higher at the forward end to accommodate the fifth wheel, following the general practice in trailer construction.

As shown in Figure 5, the trailer chassis constitutes longitudinal channels 15—15 joined by transverse members 16 arranged to form a foundation for the tank 17. The tank is stabilized upon the chassis by means of bracing members 18 (Figures 1 and 5) which rise from the chassis along opposite sides, the upper ends of the members being joined to the sides of the tank. The tank shell is constructed of sheet metal sections which may be joined together by riveting or welding following conventional construction practice.

The tank 17 is generally V-shaped in cross section and contitutes a top member 19 joined by side walls 20—20 which converge downwardly toward each other, terminating on opposite sides of the screw conveyor indicated generally at 21. As shown in Figure 2, the tank is divided longitudinally into a forward compartment 22 and a rearward compartment 23 by an intermediate partition 24. In the forward compartment 22, the converging side walls are joined by a radial trough section 25 (Figure 7) developed from the center of the screw section so that the arcuate trough closely embraces the lower portion of the screw. In order to accommodate the screw section for the rearward compartment, the side walls converge toward a trough 26, preferably forming a continuous part of the side walls and having a radial bottom 27, following the radius of the rearward screw section (Figure 6). The top and side walls of the tank shell therefore are continuous for the full length of the trailer, the rearward compartment however being provided with the offset screw trough 26 so that the two screw sections may be placed in horizontal planes one above the other with their intermediate adjoining ends in overlapped relationship. Thus, the upper screw section and its trough 25 form a step at the forward end of the tank which overhangs the tractor and provides clearance for the fifth wheel.

As shown in Figures 2 and 6, the forward section is indicated at 28 and the rearward section at 30, with the spiral vanes of the screws extending into the passageway 32 formed at the juncture of the forward and rearward tank compartments so that the material is fed by positive displacement from the end of one screw vane to the beginning of the next, since both rotate in the same direction. The driving arrangement for the screw sections is such that the rear section is in constant driving connection with the power source while the forward section can be connected or disconnected as required. In unloading the vehicle, the rear screw section preferably is operated until the rear compartment is emptied then the forward section is engaged by operating a clutch so that both sections are driven. In this manner the material discharged by the forward screw is fed to the rearward one and finally discharged through the rear outlet 31.

By reason of the tendency of cement or other pulverized material to shift while the vehicle is in transit, there is preferably provided, in addition to the intermediate partition 24, one or more supplemental partitions 33 in the forward and rearward compartments 22 and 23. The purpose of this arrangement is to prevent the material from flowing due to acceleration and deceleration or other factors tending to disturb the original weight distribution.

The material is loaded into the tank through openings 34 formed in the top of the tank, there being provided preferably one opening for each sub-division of the tank. These openings are provided with trap doors 35 hinged as at 36, preferably including gaskets to prevent water from entering the tank and possibly ruining the contents. The top of the tank between the openings includes a longitudinal flat section 37 for the safety of the operator when it is necessary to open and close the trap doors. The trailer is loaded by successively filling the several sub-divisions in any well known manner, for example, by a chute leading from an elevated hopper so that the material flows by gravity into the tank. If the tank is to be filled partially, an equal quantity of material is discharged into each sub-section so that the load is evenly distributed throughout its length.

As shown in Figures 2 and 3, the forward screw section is journalled in bearings 38 and 39, the bearing 38 being secured to the forward wall 40 and the bearing 39 being secured to the intermediate partition 24. In order to permit installation of the screw, the wall 40 includes an opening of sufficient size to permit entry of the screw, the bearing 38 including a cover plate 41 sufficiently large to close the opening. The bearings 38 and 39 are not detailed since they may follow any conventional design. By reason of the extended length of the screws, there is provided also an intermediate support bearing 42 which depends downwardly from an angle iron 43 secured to the supplemental partition 33. The bearing 42 includes a vertical bracket 44 secured by screws to the angle iron, the bearing being of the split type to permit it to be placed on opposite sides of the screw section, then assembled in position. In order to accommodate the bearing, the vane of the screw is interrupted as at 45, leaving a slight clearance on opposite sides of the bearing as shown. This interruption is relatively short and has little effect on the efficiency of the screw. The screw may be of any desired construction, for example, it may constitute a shaft 46 and a vane 47 formed of sheet metal sections welded to the shaft.

The rearward screw section 30 is journalled in bearings 48 and 50, the bearing 48 being mounted upon the vertical wall section 51 of the offset which delineates the passageway between the front and rear tank compartments. The rearward bearing 50 is mounted upon the rear wall 52 of discharge casing 53, communicating with the rear wall 54 of the tank. Discharge casing 53 includes a removable cover 55 and the casing is detachably mounted upon the tank wall 54 to permit removal or assembly of screw 30 from the rear end of the tank. The screw 30 is provided with an intermediate bearing 42 similar to the intermediate bearing for screw section 28.

The respective screws 28 and 30 are selectively driven by means of a motor 56 and a transmission system which is mounted along one side of the trailer as shown in Figures 3, 4 and 5. The motor may be of any type, preferably a light weight gasoline motor equipped with a gear reduction unit 57 and having a control clutch which may be regulated by the lever 58. The motor is mounted upon a lateral base supported by the I-beams 59 (Figure 5) extending laterally from the chassis. The respective screw sections 28 and 30 are driven by means of a counter shaft 60 journalled in bearings 61—61 mounted upon the platform 62, the counter shaft being driven from motor 56 by means of the motor sprocket 63, sprocket chain 64, and sprocket 65 which is keyed to the counter shaft 60.

The rearward screw section 30 is driven by sprocket 66 keyed to counter shaft 60, the screw having a driven sprocket 67 connected to sprocket 66 by chain 68. By this arrangement the rearward screw 30 is in constant driving connection with the motor so that whenever the clutch lever 58 is in its driving position, the rear screw is rotated.

The forward screw section 28 is driven independently of the rearward section and for this purpose is coupled to the counter shaft 60 by means of a clutch. The drive is transmitted from counter shaft 60 through a counter shaft sprocket 69, connected to the screw sprocket 70 by means of a chain 71. Sprocket 69 is loosely journalled upon the counter shaft and a driving connection is selectively established by means of the clutch collar 72, slidably keyed to counter shaft 60 by the key 73. The clutch collar is shifted by means of the hand lever 74 pivotally connected to platform 62 as at 75 and including yoke pins 76 engaged in a groove 77 of the clutch collar.

When the motor is running with its clutch engaged, a drive is established from the motor to counter shaft 60, sprocket chain 68 to the rearward screw section 30 and if the screw clutch lever 74 is in disengaged position as shown, the forward screw will remain stationary but if lever 74 is moved to clutch engaging position, both screw sections will be driven in unison.

The screw sections are rotated at a relatively slow speed and the chain and sprocket drive between the motor and screws is arranged to provide an appropriate speed reduction. For this purpose motor sprocket 63 is proportionately smaller than counter shaft sprocket 65 and also the counter shaft sprockets 66 and 69 for the screw sections are proportionately smaller than the screw sprockets 67 and 70. It has been found that a screw speed of 75 R. P. M. provides a desirable rate of discharge but the speed necessarily depends upon the pitch of the screws and may be varied to suit the type of material and other factors.

As shown in Figures 2 and 5, the tank is provided with a transverse tunnel 78 to accommodate sprocket chain 71 while the chain 68 passes beneath the forward compartment of the tank 17 so that both chains are isolated from the material in the tank. The tunnel 78 is formed by a sheet metal panel 80 having its upper edge secured to the intermediate partition 24 and extending downwardly at an angle to the partition with a bottom plate 81 joining the lower edge of panel 80 to the lower edge of the partition 24. An intermediate horizontal plate 82, secured between the partition and panel 80, forms the top wall of the tunnel. The chain 71 enters the tunnel through a slot 83 formed in the tank wall 20 (Figure 5).

In unloading the trailer, the motor 56 is started, then the motor clutch lever 58 is actuated to drive counter shaft 60, causing the rear screw section 30 to be driven by chain 68, leaving the selector clutch lever 74 in disengaged position so that the forward screw section 28 remains stationary. Operation of screw 30 moves the material from tank compartment 23, discharging through the chute 31 at the rear of the vehicle. It will be observed that the screw conveys the material from both sides of the partition 33 so that both sub-compartments are emptied at the same time. By virtue of the inclined walls 20 of the tank shell, the material flows by gravity to the screw so that all the material is discharged. When the selector clutch lever 74 is shifted to the right as viewed in Figure 3, the clutch sleeve 72 is engaged with the mating toothed hub 72a of sprocket 69 (Figure 4) thereby transmitting the drive from counter shaft 60 to sprocket 70 of the forward screw section 28. In this position both screw sections are driven unitarily and in the same direction so that the material is conveyed from forward tank compartment 22 through passageway 32 to screw section 30, the material passing longitudinally through trough 26 of screw 30 to the discharge chute 31. In order to prevent sifting of the material through the chute, there may be provided a cover plate (not shown) to close off the chute except during the unloading operation.

By the provision of a divided conveyor screw, a great deal less power is required and consequently a smaller driving motor may be utilized. When the operation of unloading a fully loaded tank is commenced, it is unnecessary to drive the forward conveyor screw section since the material necessarily must first be discharged from the rear compartment before commencing the discharge from the forward compartment. This of course eliminates the friction involved in the useless operation of the forward screw section while the rearward compartment is being unloaded.

It will be apparent that more than two screw sections can be utilized depending entirely upon the length of the tank and other determining factors. A somewhat modified arrangement is disclosed in Figure 8 whereby the screw sections are driven at their forward ends instead of at overlapping ends as in Figure 2. For this purpose there is provided a counter shaft 60a which is connected to the motor 56 by chains and sprockets in the manner above described. In this arrangement the counter shaft sprocket 69a and forward screw sprocket 70a are disposed at the forward end of the screw by virtue of the extension shaft 85. A clutch sleeve 72a is slidably keyed to extension shaft 85, engageable with a cooperating clutch collar 86 keyed to the counter shaft. The rearward screw section is in constant driving connection with the counter shaft 60a by means of the sprocket 66a and chain 68a which passes over a sprocket (not shown), mounted upon the forward end of the rearward screw in the same manner as shown in Figure 2. Thus, the rearward screw section is driven when the motor clutch is thrown into engagement so that the rearward tank compartment first is emptied after which the clutch lever 74a is shifted to the right to couple extension shaft 85 to counter shaft 60a to drive the forward screw section.

The modified structure illustrated in Figure 9 is substantially the same as disclosed in Figure 2 except that the rearward discharge chute 31 is omitted and there is provided instead an intermediate chute 86 communicating with the passageway 32 at the juncture of the overlapping screws. In this disclosure, the lead of the rearward screw section 30 is reversed so that both sections can be rotated in the same direction by a transmission system similar to that disclosed in Figure 3 to convey the material from opposite ends of the tank towards the center for discharge. Thus, both screw sections discharge directly into chute 86 instead of transferring the material from the forward to the rearward screw section as practiced in the previously disclosed arrangement.

One virtue of this arrangement is that the material in the compartments is more completely segregated, making it more practical to discharge the contents of the respective compartments to different receiving points. Also, both compartments can be unloaded at the same time for greater speed by driving both screw sections but in this instance, greater power is required.

In the preferred mode of operation, the clutch lever 58 of motor 56 is shifted to drive the rear screw section 30 while the forward section 28 remains stationary. After the rear compartment is unloaded, the screw section for the forward compartment is driven by shifting the selector clutch lever 74, as previously described. It will be noted that when the screw section 28 is coupled to the transmission, the rear section 30 also is in rotation since it is coupled permanently to the counter shaft 60. However, if desired, the transmission system can be altered readily to provide selective coupling for both screw sections in which case either the forward or rearward screw section can be coupled so as to unload the compartments selectively.

The chute 86 includes a closure, indicated at 87, to prevent material from spilling by gravity from the tank. The closure in the present instance is in the form of a door hinged as at 88 to the bottom of the chute, with a wing nut 90 arranged to clamp the door in closed position. It will be apparent that the closure may be of any conventional construction arranged to be conveniently opened and closed for loading and unloading the tank.

In the modified arrangement disclosed in Figure 10, the screw sections are located axially in alignment with each other instead of offset and the tank is provided with two discharge chutes 91 and 92, one for each compartment. The screw sections 28 and 30 are driven selectively in the same manner as above outlined and since the sections are placed end to end, the bottom of the tank is not offset as in the previous structures.

It will be noted in Figure 11 that the screw sections are driven at their opposite ends instead of centrally, for which purpose the transmission system includes a forward extension shaft 93 and a rearward shaft 94. The outer ends of the respective screw sections extend through the opposite end walls of the tank and each screw section is provided with a sprocket 95 connected by a sprocket chain 96 to a sprocket 97 keyed to a respective extension shaft. The rearward extension shaft 94 is permanently coupled to the transmission while the forward extension shaft 93 is selectively coupled by the coupling lever 74. The transmission system is similar to that disclosed in Figure 3; therefore, its operation need not be described. The conveyor system is adapted to deliver the contents of the two compartments at separate destinations as above outlined by separate operation of the screw sections. As shown, the chutes are provided with doors 87 similar to those previously described to prevent loss of material.

Having described our invention, we claim:

1. A vehicle for transporting pulverized materials comprising; an elongated tank having an intermediate partition providing a forward and rearward compartment, the rearward compartment including a discharge opening, the bottom of the forward compartment constituting a conveyor trough and the rearward compartment having a conveyor trough disposed below the plane of the conveyor trough of the forward compartment, the conveyor trough of the forward compartment including a substantially vertical passageway open to the trough of the rearward compartment, a respective forward and rearward conveyor screw section extending through said respective troughs with the inner adjoining end portions of the sections being disposed one above the other in overlapping relationship in the vertical passageway between the forward and rearward troughs, the forward screw section having a shaft extended rearwardly through said intermediate partition and the rearward screw section having a shaft extended forwardly through the end of the rearward trough, respective driving means connected to the extended shafts, said respective driving means being disposed laterally of the screw sections and adapted to rotate said forward and rearward conveyor screw section selectively to provide selective unloading of the forward and rearward compartments, and a laterally extended housing mounted upon the intermediate partition within the tank to enclose the driving means for the forward screw section the said housing having an opening to the exterior of the tank with the said driving means extending into the housing through said opening.

2. In a semi-trailer for transporting pulverized materials, an elongated tank having a fifth wheel at its forward end and road wheels at its rearward end, said tank having a partition at a point intermediate its length providing a forward and rearward compartment, the forward compartment having its bottom disposed at an elevation above the rearward compartment to accommodate the fifth wheel, an intermediate connecting wall joining the forward and rearward compartment bottoms, the said wall being spaced longitudinally from the partition to provide a substantially vertical passageway extending from the forward to the rearward compartment, a sectional conveyor system constituting respective screw conveyor sections disposed substantially in horizontal planes one above the other within the bottom of the said forward and rearward compartments with the intermediate ends of the screw sections overlapping one another in said vertical passageway, the elongated tank having a discharge opening in its rearward compartment communicating with the rearward end of said conveyor screw section, the screw conveyor section in the rearward compartment having a shaft at its forward end extending outwardly of the tank through said intermediate connecting wall, the screw conveyor section in the forward compartment having a shaft extending rearwardly through the said partition, bearings for said shafts; one of said bearings being mounted upon the forward side of said intermediate well at the exterior of the tank, the other of said bearings being mounted upon the rearward side of said partition, and a housing extending transversely within said tank mounted upon the rearward side of the partition to enclose and protect the bearing mounted thereon from the contents of the tank.

3. In a semi-trailer for transporting pulverized materials, an elongated tank having a fifth wheel at its forward end and road wheels at its rearward end, said tank having a partition at a point intermediate its length providing a forward and rearward compartment, the forward compartment having its bottom disposed at an elevation above the rearward compartment to accommodate the fifth wheel, an intermediate connecting wall joining the forward and rearward compartment bottoms, the said wall being spaced longitudinally from the vertical partition to provide a substantially vertical passageway extending from the forward to the rearward compartment, a sectional conveyor system constituting respective screw conveyor sections disposed substantially in horizontal planes one above the other within the bottom of the said forward and rearward compartments, the intermediate ends of the screw sections being overlapped with respect to one another in said vertical passageway, the elongated tank having a discharge opening in its rearward compartment communicating with the rearward end of said conveyor screw section, the screw conveyor section in the rearward compartment having a shaft at its forward end extending outwardly of the tank through the said intermediate connecting wall, the screw conveyor section in the forward compartment having a shaft extending rearwardly through the said partition, bearings for said shafts; one of said bearings being mounted upon the forward side of said intermediate wall to the exterior of the tank, the other of said bearings being mounted upon the rearward side of the partition, a housing extending transversely within said tank mounted upon the rearward side of the partition to enclose and protect the bearing mounted thereon from the pulverized material contained in the tank, the said housing having an opening communicating with the exterior of the tank, and driving means connected respectively to the said shafts to rotate one or both of the said screw conveyor sections to discharge selectively the contents of one or both of said compartments.

4. In a semi-trailer for transporting pulverized materials, an elongated tank having a fifth wheel at its forward end and road wheels at its rearward end, said tank having forward and rearward end walls and a vertical partition at a point intermediate its length providing a forward and rearward compartment, the forward compartment having its bottom disposed in a plane above the rearward compartment to accommodate the fifth wheel, a vertical connecting wall joining the forward and rearward compartment bottoms, the said vertical wall being spaced longitudinally from the vertical partition to provide a vertical passageway extending from the forward to the rearward compartment, a sectional conveyor system constituting a pair of screw sections disposed substantially in horizontal planes one above the other within the bottom of the said forward and rearward compartments with the inner ends of the sections overlapping one another in said vertical passageway, the elongated tank having a discharge opening in its rearward compartment communicating with the rearward end of the conveyor screw section, the screw conveyor section in the rearward compartment having a shaft at its forward end extending outwardly of the tank through said vertical connecting wall, the other of said conveyor sections having a shaft extending rearwardly through the said vertical partition, bearings for said shafts, one of said bearings mounted upon the forward side of the vertical connecting wall to the exterior of the tank, the other of said bearings mounted upon the rearward side of the vertical partition, a housing mounted upon the rearward side of the vertical partition enclosing the said bearing and having an opening leading to the exterior of the tank, the opposite ends of said screw conveyor sections each including a shaft extending outwardly through the forward and rearward end walls of the tank, and respective bearings mounted externally upon said forward and rearward walls for supporting said shafts, whereby the bearings at both ends of the conveyor screw sections are isolated from the contents of the tank and accessible from the exterior thereof.

5. In a semi-trailer for transporting pulverized materials, an elongated tank having a partition at a point intermediate its length providing a forward and rearward compartment, the forward compartment having its bottom disposed in a plane above the rearward compartment, a connecting wall joining the forward and rearward compartment bottoms, the said wall spaced longitudinally from the partition to provide a substantially vertical passageway extending from the forward to the rearward compartment, respective screw conveyor sections disposed substantially in horizontal planes one above the other with the intermediate ends of the screw sections overlapping one another in said vertical passageway, the screw conveyor section in the rearward compartment having a shaft at its forward end extending outwardly of the tank through said intermediate connecting wall, the screw conveyor section in the forward compartment having a shaft extending rearwardly through the said partition, respective sprockets mounted on said shafts, one of said sprockets being disposed at the forward side of said intermediate wall at the exterior of the tank, the other of said sprockets being disposed at rearward side of said partition, a housing extending transversely within said tank at the rearward side of the partition to enclose the sprocket therein, and having an opening to the exterior of the tank, a power unit mounted alongside the tank, the power unit including a pair of driving sprockets aligned with the sprockets of the conveyor screw sections, and respective chains connecting the aligned sprockets, one of said chains extending transversely through the opening in said housing and the other of said chains extending transversely beneath the tank.

6. In a vehicle for transporting pulverized materials, an elongated tank having an intermediate partition providing a forward and rearward compartment joined by an intermediate offset in the tank bottom, the rearward compartment including a discharge opening, a rotatable conveyor screw section in each of the compartments disposed substantially in horizontal planes one above the other with the intermediate ends of the sections overlapped, the forward screw section having a shaft extending rearwardly through the intermediate partition and the rearward screw section having a shaft extending forwardly through said intermediate offset to the exterior of the tank, a respective driving sprocket mounted upon the extended shafts of the screw sections, a housing within the tank enclosing the driving sprocket of the forward screw section, and open to the exterior of the tank, a power unit including a counter shaft externally of the tank parallel with and laterally adjacent the overlapped screw sections, a sprocket loosely mounted upon the counter shaft having a chain extending into said housing and passing over the sprocket therein for selectively driving the forward screw section, a second sprocket fixed upon said counter shaft having a chain extending beneath the tank bottom and passing over the sprocket at the said intermediate offset providing a fixed drive for the rearward screw section, and a shiftable clutch element on said counter shaft arranged selectively to uncouple the loose sprocket from the counter shaft, whereby the rearward compartment may be unloaded in advance of the forward compartment by uncoupling said clutch to cause the forward screw section to remain stationary while the rearward screw section is driven.

FRANK A. BEYER.
RALPH A. BRADLEY.

REFERENCES CITED

The following references are of record in the file of this patent:

UNITED STATES PATENTS

| Number | Name | Date |
| --- | --- | --- |
| 726,711 | Lewis | Apr. 28, 1903 |
| 1,050,889 | White | Jan. 21, 1913 |
| 2,029,297 | Peyton | Feb. 4, 1936 |
| 2,110,262 | Curtis | Mar. 8, 1938 |
| 2,131,907 | Surdy | Oct. 4, 1938 |
| 2,290,460 | Winsor | July 21, 1942 |
| 2,495,907 | Reinking | Jan. 31, 1950 |